Victor J. Sigoda
INVENTOR
BY Jacob J Bobrow
ATTORNEY

March 7, 1961 V. J. SIGODA 2,973,731

COMPOUND STITCHING DEVICE

Filed May 31, 1955 7 Sheets-Sheet 2

Victor J. Sigoda
INVENTOR

BY Jacob J. Bobrow
ATTORNEY

INVENTOR.
Victor J. Sigoda

BY Jacob J. Bobrow
ATTORNEY

March 7, 1961

V. J. SIGODA 2,973,731

COMPOUND STITCHING DEVICE

Filed May 31, 1955

7 Sheets-Sheet 4

Victor J. Sigoda
INVENTOR

BY Jacob J. Bobrow ATTORNEY

INVENTOR.
Victor J. Sigoda

BY Jacob J. Bohsow
ATTORNEY

COMPOUND STITCHING DEVICE

INVENTOR.
Victor J. Sigoda
BY
Jacob J. Bobrow

INVENTOR.
Victor J. Sigoda
BY
Jacob J. Bobrow

United States Patent Office 2,973,731 Patented Mar. 7, 1961

2,973,731

COMPOUND STITCHING DEVICE

Victor J. Sigoda, Great Neck, N.Y., assignor to Man-Sew Corporation, New York, N.Y., a corporation of New York Filed May 31, 1955, Ser. No. 511,933

21 Claims. (Cl. 112—162)

This invention relates to devices for the production of dual or compound seams in a single sewing operation. By means of such devices, overedge stitching may be simultaneously combined with a spaced, straight seam to join two or more plies or layers of fabric in the manufacture of apparel.

Compound seams are desirable because the overedge stitching captures and confines the thread filaments of the raw fabric edge and prevents unravelling, while the straight stitch gives stability to the junction of the fabric plies.

Previously, dual stitch sewing machines have been developed which produce a chainstitch seam with overedge stitching. Chainstitch seams, as a class, have one disadvantage. If but a single stitch breaks, the seam rapidly disintegrates. A true lockstitch seam is preferred in those garment constructions in which it is desired to avoid such mishaps.

The invention shown and described herein relates mainly, but not exclusively, to a device which produces overedge stitching combined with a lockstitch seam in one operation. No previous device has combined these types of stitching in the same operation. Such dual seams have heretofore been produced in two separate operations on two distinct types of sewing machines and involved transfer of the garment from one machine to the other. Thus the production of such seams required separately not only the time for producing each type of stitch on its own machine, but additionally, time involved in transferring from one machine to the other. It also involved the problem of obtaining uniformity in spacing of the two stitches because they were produced separately, and accordingly, a high degree of care and skill were required.

The principles disclosed, while dealing primarily with machines which combine a lockstitch seam with overedge stitching in a single operation, also apply to machines in which the overedge stitching may be combined with a chainstitch seam in one operation.

Because a large number of single needle sewing machines, either of the lockstitch or chainstitch variety, are already in use, a significant advantage can be realized by converting such machines to produce overedge stitching simultaneously with the standard straight stitch already available. Hence the invention has been shown in the form of an attachment for such machines because of the inherent economic benefits resulting from the greater utilization of such existing machines. It will be appreciated, particularly by those versed in the art, that the principles disclosed also may readily be applied to complete machines manufactured initially to produce both types of stitching. It is to be understood therefore that the disclosure is to be taken by way of illustration of the principles of the invention and not in limitation thereof.

It accordingly is an object to provide a device which may be attached to standard industrial sewing machines, with only minor modification, to achieve the combination of overedge stitching with a lockstitch or chainstitch seam in a single sewing operation. It is a further object to indicate how the same principles may also be applied to complete machines capable of producing such compound seams.

These objects have been achieved by supporting the operating mechanism for two loopers which cooperate with one of the machine needles to form the overedge stitching in a unitary housing which is mounted on the cloth-plate of a sewing machine so that the looper rock-shafts may operate on axes which are disposed wholly above the cloth-plate of the sewing machine. This construction permits the device to be made in a form in which it can be attached to existing sewing machines and accordingly makes possible the manufacture of compound seaming machines more economically than heretofore.

Adequate lubrication for high speed operation is obtained by using the same housing as an oil reservoir in which the looper operating mechanism operates. This unitary construction makes possible a relatively compact addition to various factory type sewing machines which may be mounted on the cloth-plate under the machine arm with a minimum of obstruction to the passage of the work.

As disclosed herein, such a combination is made with a machine which produces a true lockstitch. This is an exceedingly difficult arrangement to effect. It has heretofore been deemed impractical to combine lockstitching and overedging in a single machine because proper lockstitch formation requires very close spacing between the top of the lockstitch loop-taker or "hook" and the bottom of the throat-plate. With the feed dog operating through the throat-plate and in the space between the "hook" and the throat-plate, the bulk of the "hook" and its operating mechanism seemed to preclude the addition of any other operating elements required for the formation of overedge stitching.

By utilizing a feed dog having provision for lateral or transverse clearance, such as for example the version shown herein with an internal passageway provided by a rectangular opening beneath its working surface, or of the two part or differential feed type, it becomes possible for an overedge looper to pass beneath the working surface of the feed dog to meet its cooperating needle in the crowded space between the bottom of the throat-plate and the top of the "hook," by mounting the operating mechanism for that looper wholly above the cloth-plate, by rocking that looper from above so that it can pass through an additional opening provided in the throat-plate and through the passageway in the feed dog, the combination of the two types of stitching, heretofore thought impossible, has now been accomplished.

A further object is to provide the device with means for trimming the free edge of the work in advance of the overseaming operation to produce a neat and uniform seam edging. This is accomplished by incorporating a cutting mechanism and operating it from the looper drive means.

In the drawings:

Fig. 1 is a front elevational view of a high speed lockstitch machine to which the invention has been applied, part of the machine standard having been broken away to show the power take-off gear drive mechanism through which the overseaming mechanism is operated from the hook actuating shaft and another part of the machine having been broken away to show the operating relationship of the needle, the loopers and the "hook";

Figure 2:
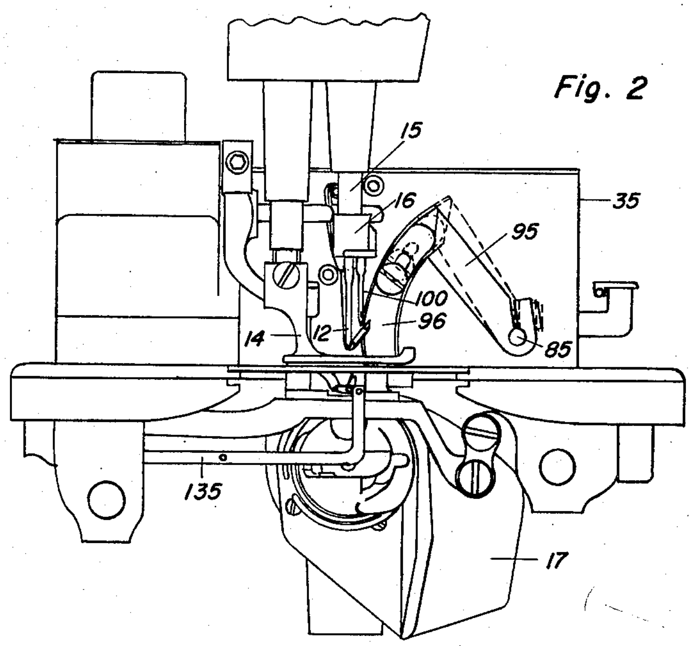
Fig. 2 is an end elevational view of the machine shown in Fig. 1, the top part of the machine being omitted, to show the device as viewed from the needle end of the machine.
Figure 3:
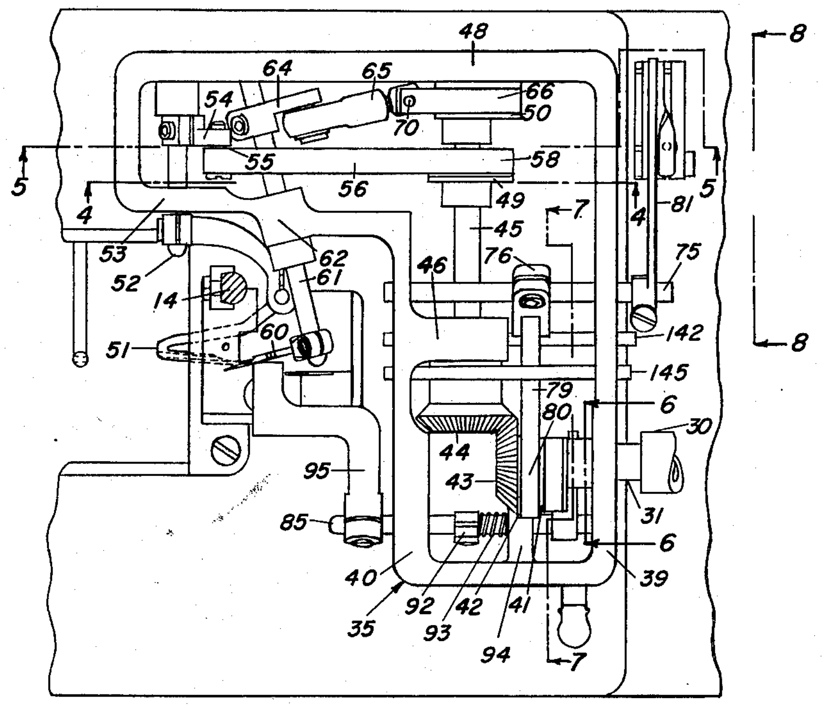
Fig. 3 is a top plan view of the overseaming mechanism as applied to the machine, part of the machine, and more specifically the needle bar and the needles, having been omitted so that the loopers are more clearly visible.
Figure 8:
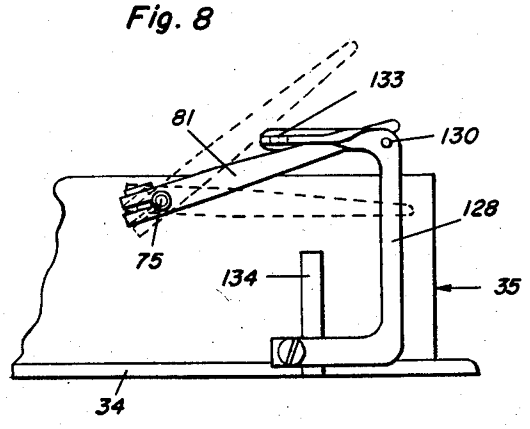
Figure 9:
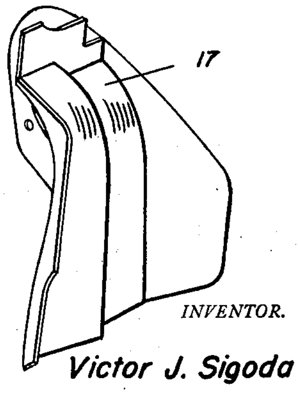
Figures 10, 11, 12, 13:
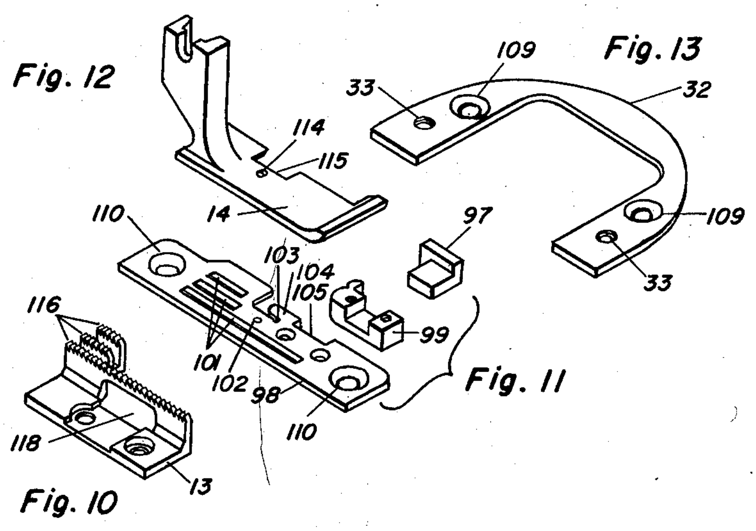
Figure 14:
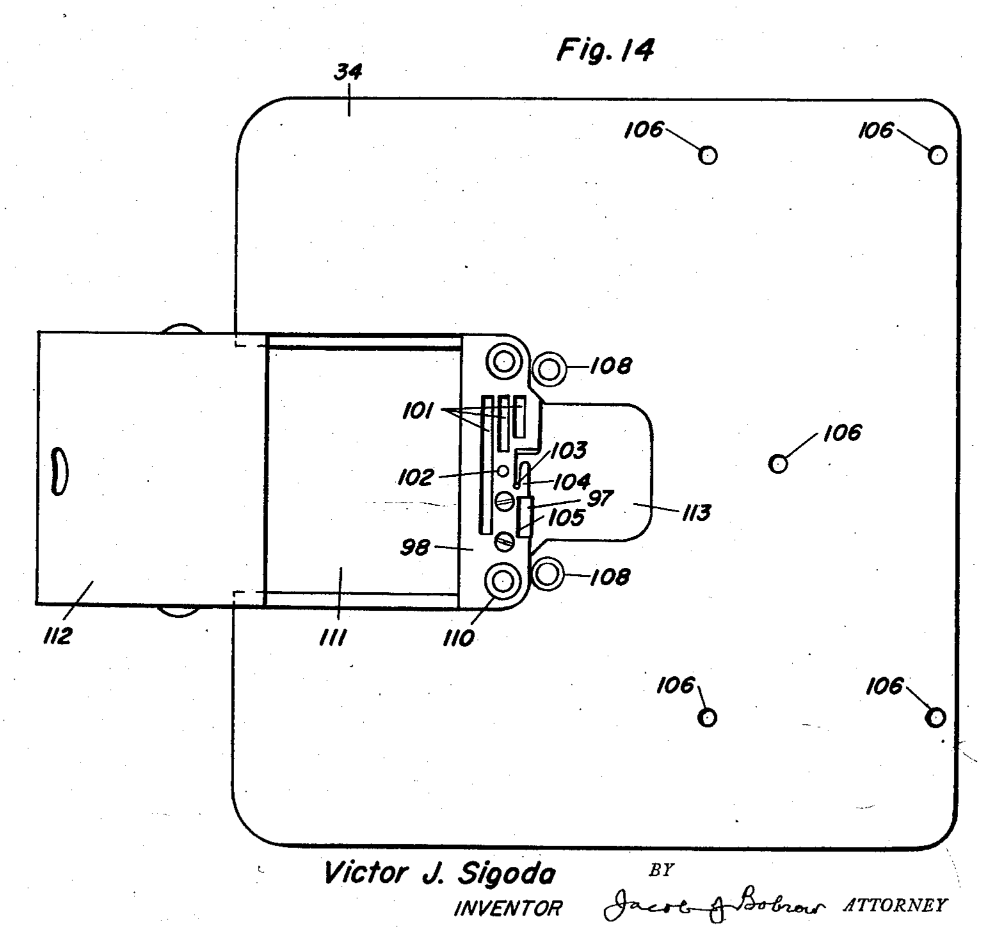
Figure 15:
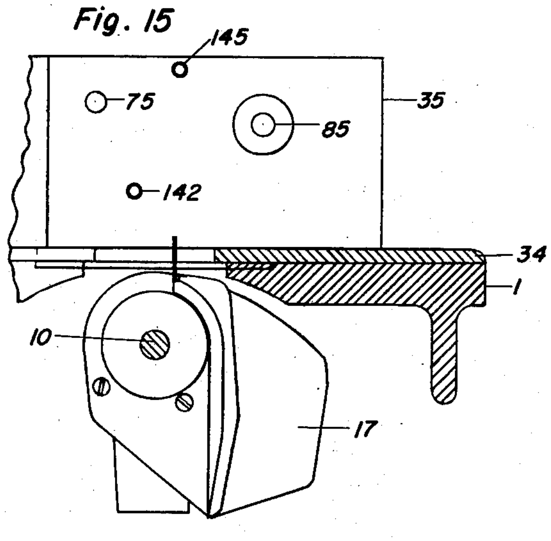
Figure 17:
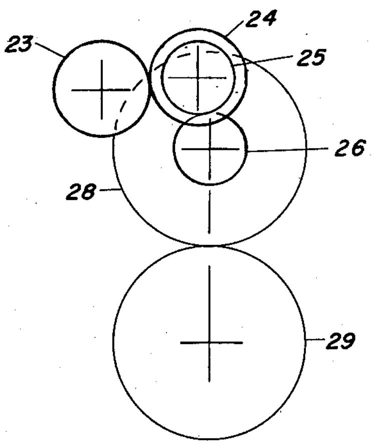
Figure 16:
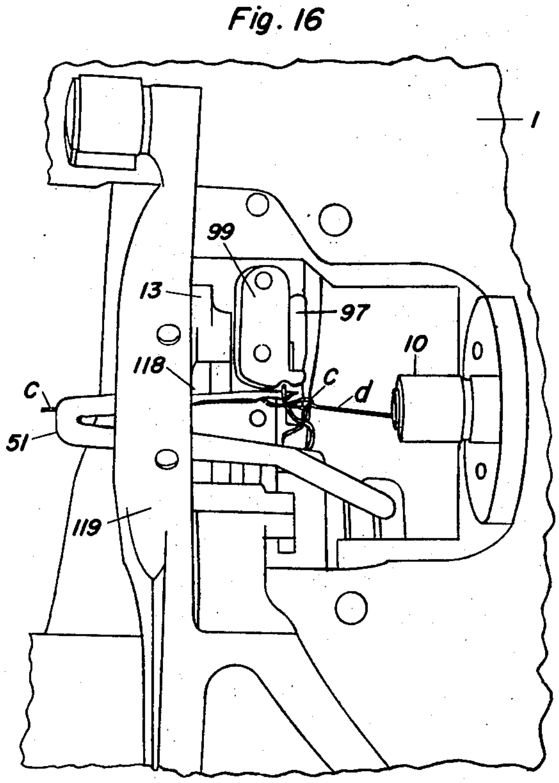
Figure 18:
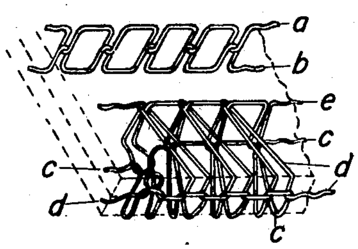
Figure 19:
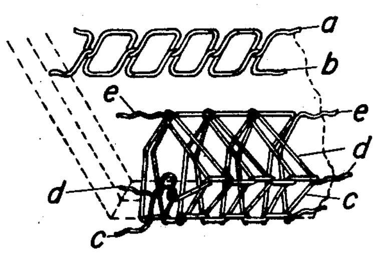
Figure 20:
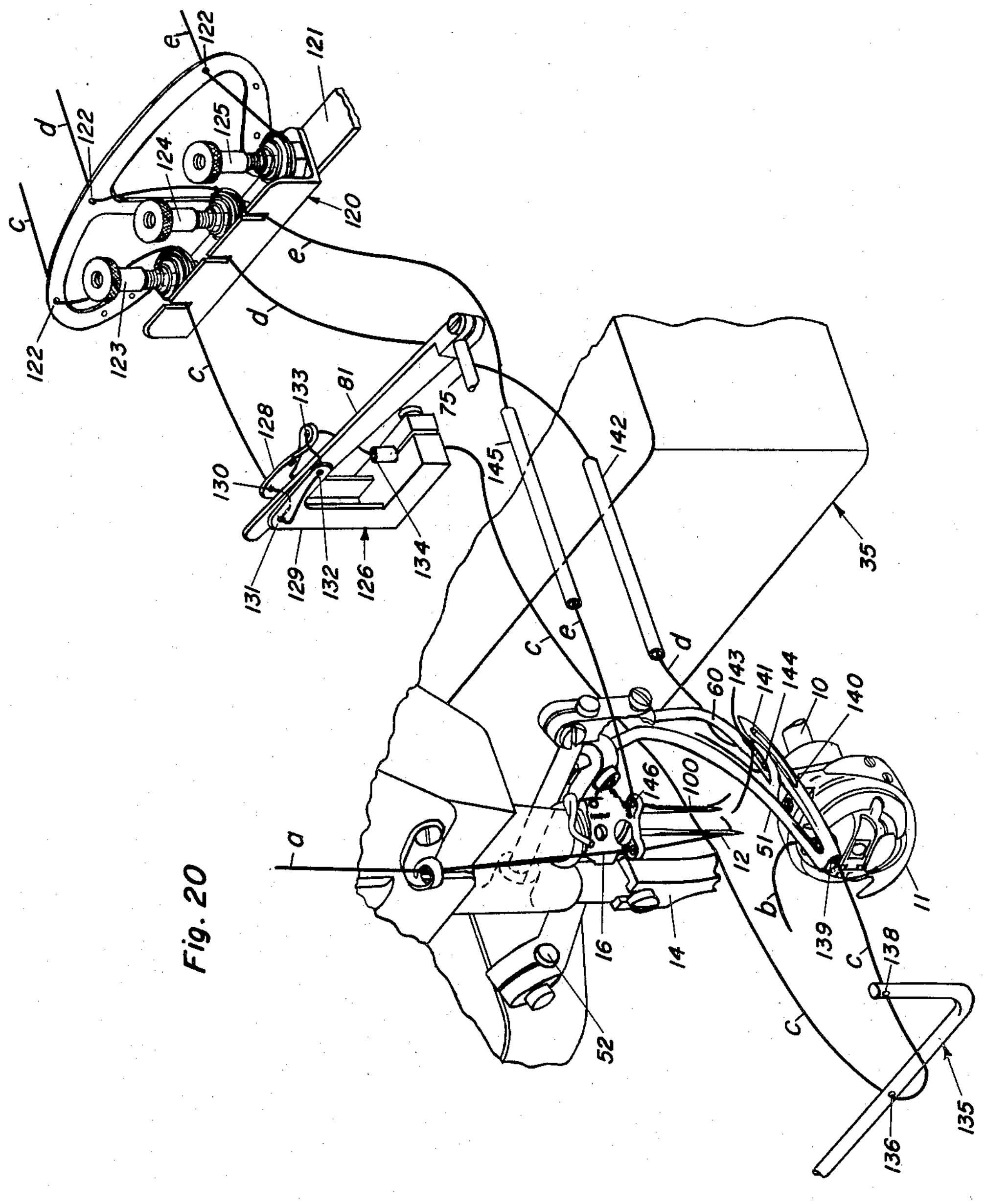
Figure 21:
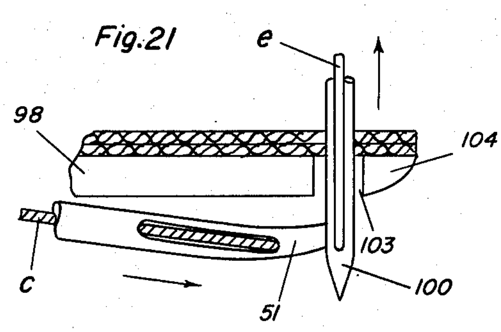
Figure 22:
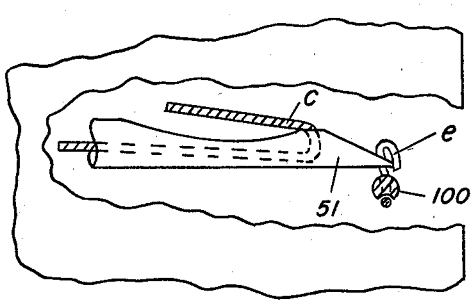
Figure 23:
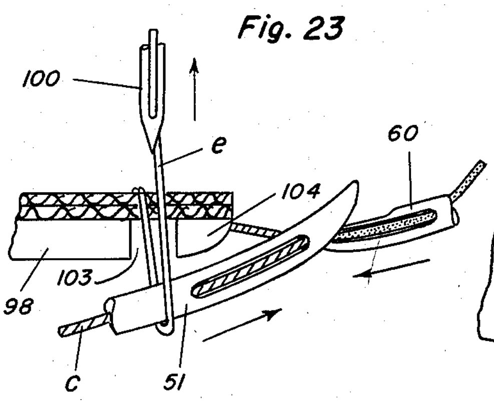
Figure 24:
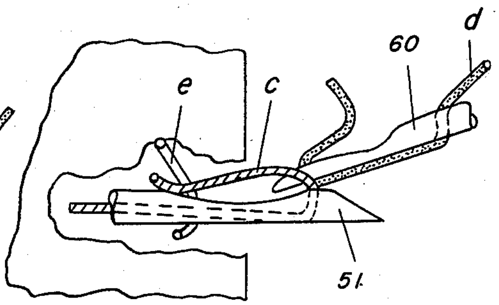
Figure 25:
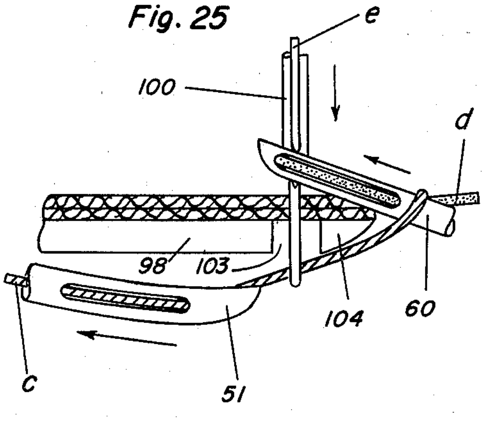
Figure 26:
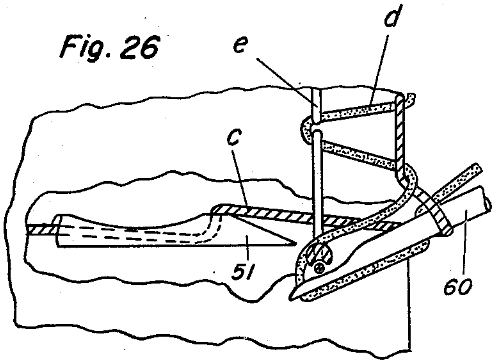

Figs. 4, 5, 6 and 7, are sectional detail views taken respectively on lines 4—4, 5—5, 6—6 and 7—7 of Fig. 3, certain mechanism having been omitted in each for clarity;

Fig. 8 is a fragmentary view taken mainly on line 8—8 of Fig. 3 showing the thread control lever for the primary looper, the extremes of position being shown in broken line, and also showing the thread guides on opposite sides of the lever;

Fig. 9 is a perspective view of the cloth chip guard which deflects the cuttings from the "hook" and prevents fouling thereof;

Fig. 10 is a perspective view of the modified feed dog;

Fig. 11 is a perspective view of the needle plate, the stationary cutter blade and the means by which it is secured to the needle plate;

Fig. 12 is a perspective view of the presser foot;

Fig. 13 is a perspective view of the adapter plate which replaces the usual work support or throat-plate and which is mounted in its place in its opening so that the mounting plate of the device may be screwed thereto to be attached to the cloth-plate;

Fig. 14 is a plan view of the mounting plate by means of which the overseaming mechanism is secured to the cloth-plate showing the slide plate displaced to permit access to the bobbin case holder and with the needle plate and stationary cutter blade placed in position thereon, but not screwed thereto;

Fig. 15 is a fragmentary sectional view taken from the same point as Fig. 2, but with many parts omitted to show how the chip guard is mounted in place to shield the "hook" which has been removed for greater clarity;

Fig. 16 is a bottom view of a portion of the sewing machine showing the primary looper and how it transversely clears the feed dog, the "hook" having been omitted for clarity;

Fig. 17 is a diagrammatic representation of the power take-off gear drive unit as seen from the handwheel end of the sewing machine;

Fig. 18 is an enlarged representation of the two different stitch seams formed in the work by the device, the thread tensions having been adjusted to produce an overseaming stitch identified in the "Federal Specification for Stitches, Seams, and Stitching" as type 504;

Fig. 19 is a similar view, the thread tensions having been adjusted to produce an overseaming stitch of type 505;

Fig. 20 is a diagrammatic perspective view showing the threading arrangement for the overedge stitch, the threading arrangement for the lockstitch being conventional;

Fig. 21 is a detail view showing the beginning of the formation of the overedge stitch, the point of the primary looper having just intercepted the thread loop of its complementary needle;

Fig. 22 is a plan view of the structure shown in Fig. 21;

Fig. 23 is a detail view showing a later stage, the primary looper having passed through the needle thread loop to reach the position at which the point of the secondary looper just intercepts the thread loop carried by the primary looper;

Fig. 24 is a plan view corresponding to Fig. 23;

Fig. 25 is a detail view showing the last stage of the overedge stitch formation, the secondary looper having carried the intercepted primary looper thread over the edge of the work and having reached the position in which it presents its own thread loop to the point of the descending needle for interception; the three interceptions in sequence serving to secure the threads together in the work; and Fig. 26 is a plan view of the structure shown in Fig. 25.

*The sewing machine*

An embodiment of the invention is shown in the form of an attachment applied to an industrial sewing machine of the lockstitch type of the class generally known as the Singer 400W. Such machines have been disclosed in in various U.S. patents to Sidney Zonis, typically as in Patent No. 2,267,581 of December 23, 1941. It should be understood however that with appropriate modification the invention may be as readily incorporated in other lockstitch machines of the same manufacture as well as to such machines of other manufacture. If desired, the invention may also be applied to single needle chainstitch machines such as the Singer 400W10 class. As pointed out previously however, the lockstitch type is preferred because of the intrinsic stability of the lockstitch seam.

The machine shown consists of a cloth-plate 1, from one end of which rises the standard 2 of a hollow bracket-arm 3 overhanging the cloth-plate and terminating at its free end in a head 4. Rotatably journalled in the bracket-arm 3 is a horizontally disposed main actuating shaft (not shown) carrying at one end a belt-pulley 5. Within the bracket-arm 3, the main-shaft carries a peripherally grooved pulley (not shown, but similar to pulley 8), connected by a clip-belt 6 disposed within the arm-standard 2, to a grooved pulley 8 carried by one end of a loop-taker and feed-actuating shaft 9 rotating one-to-one with the main-shaft and disposed below the cloth-plate 1 in substantial parallelism therewith.

As disclosed in the Zonis patent, shaft 9 carries an internal gear at its other end, the gear being in mesh with a pinion which is integral with one end of a horizontally disposed loop-taker shaft 10. The ratio of the internal gear and the pinion is such that the pinion rotates twice for each rotation of the gear. Secured to the free end of shaft 10 is the rotary loop-taker 11 or as it is more popularly known in the trade, the "hook." As is well known in the art, the loop-taker is complemental to the needle 12 in the formation of lockstitches.

It is desirable to modify slightly the point of the "hook" gib which intercepts the needle thread loop. This modification, which ensures proper lockstitching, is required to provide clearance for the overedge needle. The thread guard of the "hook" is also modified slightly to provide clearance and for "hook" adjustment.

The work is advanced past the stitch-forming mechanism by feeding mechanism generally the same in construction as that disclosed in the Zonis patent. Since the feeding mechanism of itself forms no part of the invention herein, it is not further described. Additional details may be obtained from the Zonis patent and from his earlier Patent No. 2,151,308, of March 21, 1939, mentioned therein. Such feed mechanism produces the usual four motions of the modified feed dog 13 herein, which in conjunction with the presser foot 14 serves to advance the work to the stitch-forming mechanisms.

The stitch-forming mechanism for the lockstitch includes drive mechanism for the needle bar and take-up mechanism. As disclosed in Zonis Patent No. 2,267,581, the needle-bar drive mechanism includes a crank-disk carried by the end of the main actuating shaft. The crank-disk has extending therefrom, a crank-pin which is connected by a link pivotally connected to a vertically reciprocatory needle bar 15 which carries the dual needle holder 16 utilized in the present invention.

The lockstitch take-up mechanism is generally similar to that described in Zonis Patent No. 2,191,736 of February 27, 1940. This take-up mechanism does not form any part of the invention per se, and is of such well known construction and operation as to require no further description.

As detailed to this point, the machine operates in the conventional manner to form lockstitches in the work by the penetration thereof of a top needle thread inserted by a single needle carried by the needle bar 15, the needle thread being interlocked with the bottom bobbin thread by means of the rotary loop-taker or "hook" 11 which intercepts a thread loop formed near the eye of the needle when the latter passes completely through the work and below the cloth-plate. This action is so fundamental and is so well understood in the art as to require no further amplification.

*The power take-off gear unit*

Within the lower end of arm-standard 2, a bracket member 20 is securely fixed to the cloth-plate 1. At its upper end, bracket 20 is formed with an elongated bearing 21 for a drive-shaft 22, both the bearing and the drive shaft extending through an opening in the wall of the arm-standard 2.

To the end of drive-shaft 22 within the arm-standard, gear 23 is fixed and is in mesh with one section 24 of a compound gear 24—25 journalled on a stud shaft fixed in the bracket. Below compound gear 24—25, a second stud shaft is journalled in the bracket and carries a second larger compound gear 26—28, section 26 being in mesh with section 25 of the first compound gear. The relatively large gear section 28 is in mesh with the input drive-gear 29 fixed on one end of shaft 9 adjacent pulley 8. The ratios of the gears and gear sections have been selected to be one-to-one between the input and output of the gear train so that when power is applied to belt-pulley 5, drive-shaft 22 turns at the same rate of speed as the main shaft. Shaft 22 is coupled by means of a double universal joint 30 to an output drive shaft 31 which operates the overseaming mechanism.

*The housing for the overseaming drive mechanism*

The usual throat plate of the machine is replaced by a cutout adapter plate 32, Fig. 13, having an extra pair of holes 33 threaded to receive screws by means of which the mounting plate 34 for the housing is secured to the clothplate of the sewing machine. Plate 34 carries attached thereto, an L-shaped housing 35 which contains the drive mechanisms for operating the thread loopers, a thread control member and a cutter mechanism.

Housing 35 is a one-piece, oil-tight casting, and when the unit is first assembled, a gasketed cover plate 36 is screwed to the top of the housing and sufficient oil introduced through oil-cup 38 to cover the working parts to provide lubrication during operation.

Figures 4, 5, 6, 7:
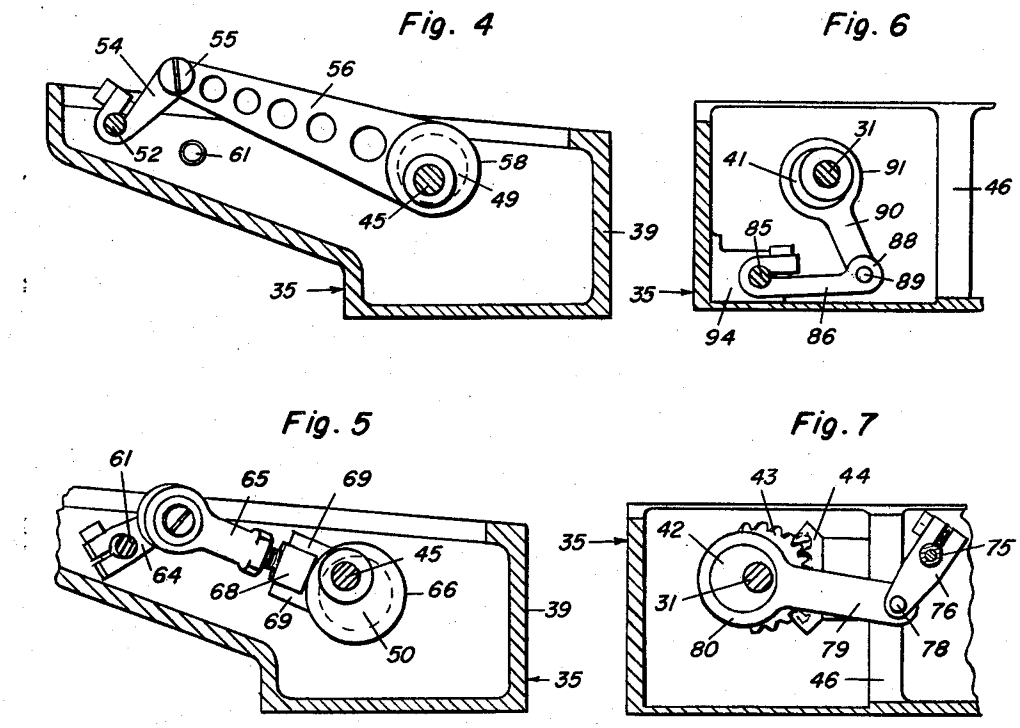

Referring now to Figs. 3, 6 and 7, in the end of the housing 35 nearest the machine operator, drive-shaft 31 is journalled in an anti-friction bearing mounted in wall 39. A first eccentric 41 is secured to shaft 31 and is rotated thereby to operate a cutter operating mechanism to be subsequently described. A second eccentric 42 and a spiral miter gear 43 are also secured to shaft 31. Eccentric 42 operates the thread control member for the primary looper. Gear 43 drives the looper operating mechanisms.

*Operating mechanisms for the thread loopers*

A mating spiral gear 44 in mesh with gear 43 is carried on one end of shaft 45 journalled in anti-friction bearings mounted in the short cross-wall 46 and the rear wall 48 of housing 35. Shaft 45 carries two eccentrics 49 and 50 which respectively operate the primary and secondary loopers.

Primary looper 51 is oscillated by looper-shaft 52 journalled in bearings in back wall 48 and in the long cross-wall 53. Referring now to Figs. 3 and 4, shaft 52 is rocked through a linkage which consists of a short-arm 54 clamped on shaft 52 which is pivotally connected at 55 with an eccentric-arm 56, one portion of which is a strap 58 encircling eccentric 49. Secondary looper 60 is oscillated by an obliquely disposed looper-shaft 61 journalled in bearings in back wall 48 and in an obliquely offset joggle 62 in cross-wall 53. Referring now to Figs. 3 and 5, shaft 61 is rocked by a linkage which includes short-arm 64 joined to the universally movable ball of a ball-joint rod end bearing 65. A strap 66 which encircles eccentric 50 is connected to the rod end bearing 65 by the threaded shank of a T-block 68, the threaded shank being received within a threaded socket of the rod end bearing. The head of T-block 68 is pivotally mounted between the arms 69 of strap 66 by transverse pin 70.

This flexible linkage permits the rocking of shaft 61 from eccentric 50 even though shafts 45 and 61 are obliquely disposed to each other, the ball joint and the pivotal mounting of the T-block permitting transmission without binding, of the lateral movement developed by the rotation of eccentric 50 in strap 66.

*Operating mechanism for the thread control lever*

Operating shaft 75 for the thread control lever is journalled in bearings in walls 39 and 40 rearwardly of drive-shaft 31 and somewhat above shaft 45. Referring now to Figs. 3 and 7, a short-arm 76 is clamped to shaft 75 and the end of arm 76 is pivotally connected at 78 with eccentric-arm 79, having a strap portion 80 which encircles eccentric 42. Externally of the housing 35, shaft 75 carries, adjacent wall 39, a thread control lever 81 which is concerned with control of the thread handled by primary looper 51.

"Thread control" as used herein concerns both the take-up of excess thread occurring during a portion of the looper movement in the course of the stitch formation and the pull-down of additional thread from the thread supply during another portion of the stitching cycle to provide enough thread for subsequent looper action.

*Operating mechanism for the cutter mechanism*

Cutter operating shaft 85 is journalled in bearings in walls 39 and 40 forwardly of drive-shaft 31 and somewhat below it. Shaft 85 is rocked about its axis by a linkage which connects it with eccentric 41. Referring now to Figs. 3 and 6, this linkage includes a lever 86 which is clamped to shaft 85 at one end and which is provided with a Y-shaped yoke or clevis 88 at its other end. A pin 89 held between the two arms of the Y-shaped yoke or clevis 88 is freely received in a bore at one end of a downwardly depending eccentric-link 90. The upper end of link 90 is formed into a strap 91 which encircles eccentric 41.

The space between the two parallel arms of clevis 88 is wide enough to permit shaft 85 to be shifted axially without affecting the transmission of the rocking motion from eccentric-link 90 to lever 86. This provision for axial adjustment is made because it is necessary to adjust the shearing contact of the cutter members initially and subsequently after wear takes place. Shifting of shaft 85 is effected by first loosening the set screw of clamp-bushing 92, adjusting the position of shaft 85 until the mating cutters are in proper engagement, and then re-setting clamp-bushing 92 against the tension of spring 93 coiled about shaft 85 and which is held between clamp-bushing 92 and the short-wall 94.

Referring now to Fig. 2, externally of the housing, adjacent wall 40, cutter operating shaft 85 carries movable cutter member 95, provided at its lower extremity with a cutter blade 96 which engages a mating stationary cutter blade 97 (see Fig. 11) which may be made integral with the needle plate 98 or may be secured thereto as shown in Figs. 11 and 14 by means of a clamp-block 99 and screws passing through the needle-plate and threaded into the clamp-block.

Figure 1:
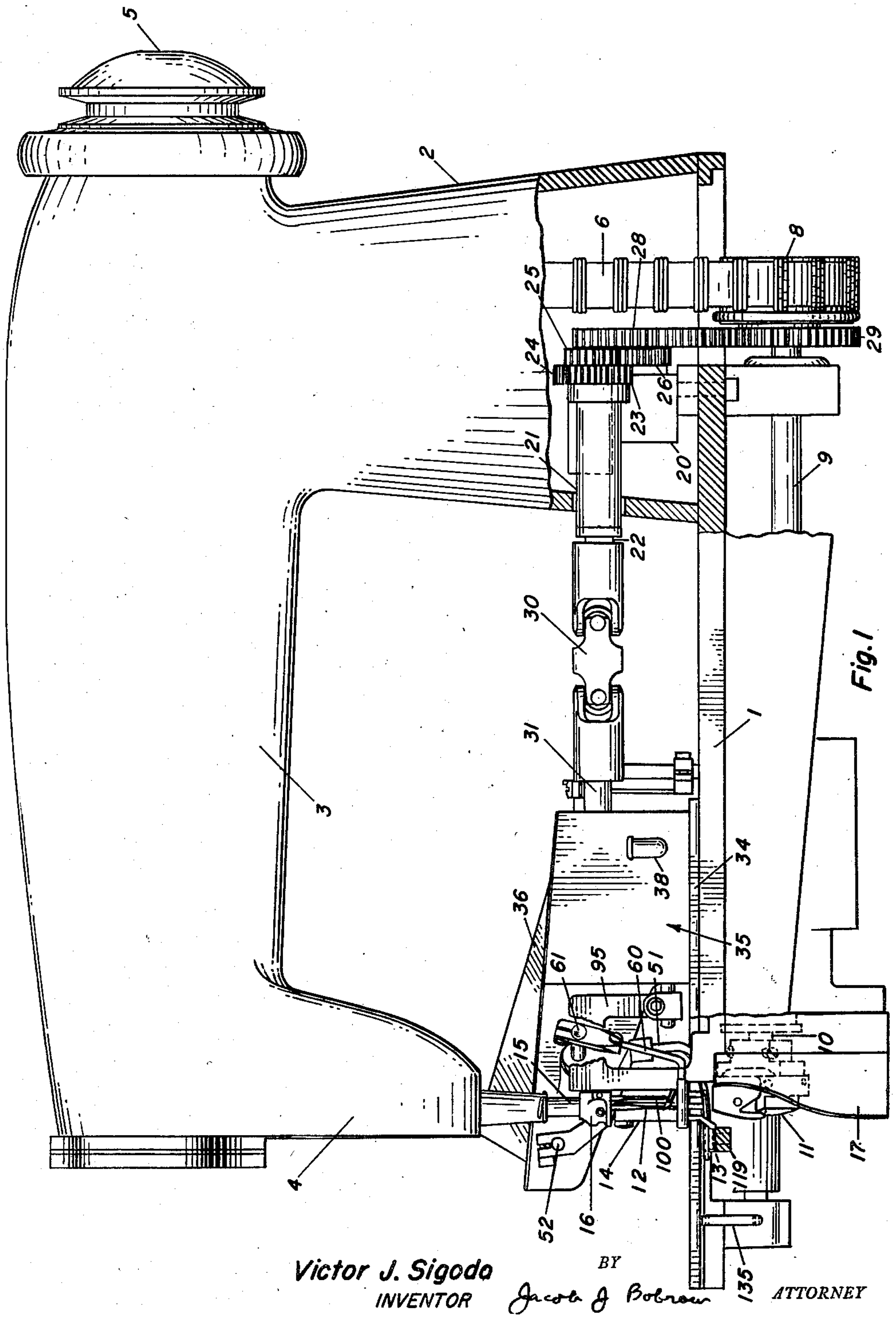

Operation of the cutter mechanism produces cuttings and cloth chips which if not deflected from the "hook" would quickly foul it. A chip guard or shield 17 serves to prevent fouling of the "hook" and tends to keep the clippings from other parts of the machine as well. Chip guard 17 is formed as indicated in Fig. 9, and is shown in position in Figs. 1, 2 and 15.

*The needle-bar, needles and needle-plate*

Referring now to Fig. 2, needle-bar 15 is fitted at its lower end with a dual needle clamp member 16 in which lock-stitch needle 12 and overedge needle 100 are held. Needle 12 is centrally disposed with respect to the axis of the needle-bar, being in the same position as it normally occupies for the usual lockstitch. Overedge needle 100 is disposed to the right, viewing the machine as in Fig. 1, and forwardly of needle 12, as seen in Fig. 2. Needle 100 is somewhat shorter than needle 12 to meet the requirements imposed by coaction with the loopers in the formation of the overedge stitch.

The needle plate 98, as shown in Figs. 11 and 14, is provided with slots 101 for the runners of the feed dog 13, one needle hole 102 for the lockstitch needle 12 and a needle hole 103 for the overedge stitch needle 100. The slot running from hole 103 separates stitch tongue 104 from the rest of the needle-plate. This tongue serves to support the edge of the work during the formation of the overedge stitch, and is tapered on its under side toward the rear of the machine to facilitate pulling off of the formed overedge stitch as the feed moves the work rearwardly. The needle-plate is also provided with a rectangular notch 105 to receive the stationary cutter blade 97.

*The mounting, slide and adapter plates*

Referring to Fig. 14, mounting plate 34 is provided with a series of openings 106, countersunk on the underside of the plate, for flat-head screws which are threaded into corresponding openings in the undersurface of housing 35 to secure them together. Plate 34 is mounted on cloth-plate 1 by flat-head screws which pass through openings 108 in the mounting plate and corresponding openings 109 in adapter plate 32 and are threaded into the tapped throat-plate screw holes of the machine.

The needle-plate is secured in position on the mounting plate and machine by flat-head screws which pass through countersunk openings 110 in needle-plate 98 and corresponding clearance holes (not shown) in the mounting plate and are threaded into tapped holes 33 of the adapter plate. As metioned previously, adapter plate 32 replaces the usual throat-plate of the sewing machine, or optionally, may be completely omitted.

The mounting plate is cut out at 111 and provided with rabbets in which slide plate 112 is slidably fitted. Plate 112 permits access to the underpart of the machine for insertion of the lockstitch bobbin in its casing within the "hook" 11 and also permtis the threading of primary looper 51. A second cutout at 113 in mounting plate 34 provides clearance for both loopers as they operate in the course of the formation of the overedge stitch. Opening 113 also provides clearance for the downward movement of movable cutter blade 96 and passage for the scraps of material trimmed from the edge of the work just prior to the overedge stitching.

*The presser foot and feed dog*

Referring now to Fig. 12, presser foot 14 is provided with a needle hole 114 for the lockstitch needle 12 and a rectangular notch 115 laterally adjacent thereto and in register with the stitch tongue 104 on the needle-plate below. This notch provides clearance for passage of the second needle and for the movement of the secondary looper as it passes upwardly across the edge of the work to present its thread loop to the second needle for interception (see Fig. 3).

As may be seen from Fig. 16, feed-dog 13 is mounted on a feed-bar 119 whose compound movements provide the well known four motion feed action of the feed-dog. As seen in Fig. 10, the feed-dog generally resembles the conventional feed-dog except that it is suitably modified to permit lateral clearance for looper 51. Such clearance may be provided, as for example, by an internal passageway such as rectangular opening 118 under the feeding or working surface of the feed dog. It is through such an opening that the primary looper 51 passes over the "hook" 11 during its leftward transverse oscillation (viewing the machine as in Fig. 1). The extreme of this material movement is indicated in Figs. 3 and 16.

Certain types of industrial sewing machines, such as the Singer 400W30 and 400W31 machines, have differential feed mechanisms. Such mechanisms comprise two separate and independently operated feed dog sections, each mounted on and operated by its own feed bar. Such feed bars may be operated at the same or different lengths of feed and either in or out of phase. This type of feed mechanism is useful in handling "stretchy" fabrics and is also used for gathering or ruffling operations, depending upon the setting of the separate feed dog actions. Each independent feed dog section is supported on its own feed bar so that it extends cantilever fashion over the looptaker or "hook" and toward the other feed section, and with sufficient clearance beneath its working surface in the space above the top of the looptaker or "hook" to permit freedom for lateral passage of an overedge looper operated from above, such as looper 51 herein.

*Thread handling*

Referring now to Fig. 20, it will be noted that thread *a* of the lockstitch needle 12 and thread b of the bobbin within "hook" 11 are handled conventionally. The usual thread tension assembly and thread take-up are not shown because the actions of both are well understood.

Since the overedge stitch herein involves three threads *c*, *d* and *e*, a triple tension assembly 120 is mounted on a bracket 121 secured either to the back of the machine or in any other suitable location. The thread supply (not shown) consists of a stand on which spools of thread are supported, and the threads therefrom are passed through openings 122 and under the tension plates of the individual tension devices 123, 124 and 125, which are provided with tension springs and thumbnuts for individual adjustment of the tension on each thread.

The thread *c* for the primary looper 51 passes from tension device 123 to a thread control device 126 which has a pair of arms 128 and 129 pierced with a series of thread guide holes 130, 131, 132 and 133, through which the thread *c* passes in sequence. In passing from hole 130 to hole 131, the thread *c* passes under thread control level 81 and in passing from hole 132 to hole 133, it passes over lever 81. Hence as lever 81 moves downwardly additional thread will be drawn through tension device 123 from the thread supply, and as lever 81 moves upwardly, any slack in the thread *c* leading to the looper 51 will be taken up. The extent of downward and upward movement of lever 81 depends on the position of lever 81 on its rockshaft 75 and this may be adjusted either by resetting the lockscrew in its clamp portion on shaft 75 or by resetting the position of arm 76 on shaft 75.

The primary looper thread *c* passes from hole 133 downwardly through tube 134 and under the bed of the machine to a bent thread guide rod 135, passing in turn through openings 136 and 138 therein and into opening 139 in looper 51 and then through a central passage therein to opening 140 from which it emerges to lie in a longitudinal thread groove leading to and through eye 141 through which thread *c* passes to the back of the looper. In Fig. 16, thread *c* is seen leaving eye 141 and looped around thread *d* of the secondary looper which has been completely withdrawn to the right.

Thread *d* for the secondary looper 60 passes from tension device 124 through the lower thread guide tube 142 which is transversely mounted in housing 35 between walls 39 and 40. Thread *d* then enters an opening 143 running from the back to the front of looper 60 and then passes along a longitudinal thread groove which terminates in eye 144 near the point of looper 60. Thread *d* passes through eye 144 to the back of the looper.

Thread *e* for the second or overedge needle 100 runs from tension device 125 through upper thread guide tube 145 which is also mounted transversely in housing 35 between walls 39 and 40. It then enters the thread guide opening 146 on needle holder 16 and then passes through the eye of needle 100.

No take-up devices are provided for either thread *d* or *e* because they have been found unnecessary for production of the stitch types illustrated in Figs. 18 and 19. However, if a take-up device is thought necessary advantage may be taken of thread control lever 81 and the associated thread guides. Additional threads may be passed through any of the holes in arms 128 and 129 to provide either thread pull-down from the source or take-up of slack as previously mentioned.

The difference in the stitches shown in Figs. 18 and 19 is a matter of adjustment of the individual thread tensions. If the tensions used to produce the stitch of Fig. 18 are taken as references, then to produce the stitch of Fig. 19, the tensions would be adjusted so that the tension device 125 for thread *e* is lessened; the tension device 123 for thread *c* is increased; and the tension device 124 for thread *d* is increased slightly.

*Operation*

After all five threads have been inserted, the various tension devices suitably adjusted, and the work placed under the presser foot, as the machine begins to operate, the edge of the work will first be trimmed by the reciprocation of cutter blade 96 against stationary blade 97 just prior to the formation of the overedge stitching. The lockstitch will be formed slightly rearwardly of the overedge stitching, joining the piles of the work approximately one quarter of an inch inwardly from the trimmed edge. This distance is obviously a matter of choice and is controlled by the spacing of the cutting action from the point of penetration of the lockstitch needle, the spacing of the overedge needle in needle holder 16 and the positioning of housing 35 on mounting plate 34.

The steps involved in the formation of the overedge stitching will be best understood by referring to Figs. 21 to 26. As needle-bar 15 descends carrying needle 12 for interaction with "hook" 11, needle 100 also passes below the needle-plate. As needle 100 reaches its lowermost position, looper 51 has moved to the right from its extreme leftward position shown in Figs. 3 and 16, to be in position to intercept the *e* thread loop formed about the eye of needle 100 (Fig. 22). As needle 100 begins to rises, looper 51 continues to move on an arcuate path to the right, passing through the *e* thread loop, and elongating it (Fig. 23). In passing from the left to right, the eye of looper 51 is initially below needle-plate 98 but as the extreme of the right hand movement is reached, the arcuate path about which looper 51 oscillates brings the eye of the looper above the needle plate slightly beyond the position shown in Fig. 23. As looper 51 moves to this extreme rightward point, it reaches a position in which the point of looper 60 can intercept the *c* thread loop formed between the eye of looper 51 and the anchorage of the last stitch in the work (see Fig. 18).

After interception of this loop, looper 60 continues to move on an arcuate path upwardly and to the left from the point of interception and angularly until it reaches a point just forwardly of the needle 100 (Figs. 24, 25 and 26). Previously needle 100 has reached the uppermost limit of its reciprocation and has begun to descend toward the needle-plate, and just as looper 60 reaches a point where the descending point of needle 100 can intercept the *d* thread loop running from the eye of looper 60 to the last overedge stitch in the work (see Fig. 18), needle 100 has descended to be in position to intercept the *d* thread loop above the top surface of the work.

As needle 100 continues its descent through the intercepted *d* thread loop, looper 51 moves toward the left, shedding the preceding *e* thread loop, looper 60 moves to the right, shedding the *c* thread loop, and since the *d* thread loop is caught about needle 100, the three threads are interchained about stitch tongue 104 and the edge of the work. As needle 100 continues to descend below needle-plate 98, looper 51 completes its excursion to the left and returns to the initial position on its passage to the right at which it can intercept the *e* thread loop, and the cycle repeats continuously during subsequent operation of the machine.

The extent of the oscillation of loopers 51 and 60 is determined by the amount of eccentricity incorporated in their actuating eccentrics and the linkages. It is therefore a matter of choice just how much rock is produced in oscillating each of these loopers. The interrelation of the rocking is determined by the position of each eccentric on its particular shaft, and provision is made for adjustment of each eccentric by means of set screws so that just the right operating cycle for the loopers may be obtained. This also applies to the operation of the rockshaft for the movable cutter, and these are matters well within the skill of these versed in the art, and require so further elaboration.

The term "throat-plate" as used in the claims herein is intended to define the work support plate of the sewing machine which is disposed near the needles and the feed members. Herein, the "throat-plate" is a combination of the mounting plate 34 and the needle plate 98, it being understood that these plates are manufactured separately for convenience. So much of plate 34 as immediately surrounds opening 113 is in effect that part of the usual throat-plate which this combination replaces. The extension of plate 34 to its full rectangular shape as shown in Fig. 14 is for the purpose of providing the convenience of a mounting plate for the attachment as well as a throat-plate replacement in the embodiment shown.

Variations and modifications may be made within the scope of the invention without departing from the spirit thereof, and it is to be understood that the invention is not limited to the details of construction shown and described herein, but is to be construed broadly within the purview of the appended claims.

What is claimed is:

1. An attachment for a modified single needle sewing machine having a cloth-plate, a throat-plate provided with two needle holes and an opening adjacent thereto through which a looper operated by said attachment may move above and below the throat-plate, stitchforming mechanism including a reciprocating needle bar provided with means for carrying a second needle, a pair of needles carried by said needle bar, a loop-taker mounted and operating below the throat-plate and arranged to coact with one of said needles, and feed mechanism including a feed dog provided with means to permit transverse passage therethrough of said looper, said attachment comprising a casing adapted to be secured to said cloth-plate, a first rockshaft journalled in said casing for oscillating and provided with a primary thread carrying looper, a second rockshaft journalled in said casing for oscillating and provided with a secondary thread carrying looper; operating means for rocking said shafts, and a connection from said operating means adapted to be attached to a power source in said machine, said loopers being adapted to coact with each other and with the second of said needles in timed relationship to form an overedge seam when the attachment is mounted on the machine.

2. An attachement for use with a modified single needle sewing machine having a throat-plate provided with at least two needle holes and an opening adjacent thereto through which a looper operated by said attachment may move above and below said throat-plate, a reciprocating needle bar provided with means for carrying a plurality of needles, at least two needles carried by said needle bar, a rotary loop-taker operating below said throat-plate and arranged to coact with one of said needles, and feed mechanism including a feed dog provided with means to permit transverse passage therethrough of said looper; said attachment comprising a housing adapted to be mounted on the machine, a first thread carrying looper journalled in said housing for oscillation, a second thread carrying looper journalled in said housing for oscillation, actuating means for said loopers, means for coupling said actuating means to the machine to drive said loopers in timed relation relative to the reciprocation of said needles, said loopers being arranged and coordinated to interact with each other and one of said needles to form an overedge stitch, said first named looper being arranged to operate transversely between said throat-plate and said rotary loop-taker when said attachment is mounted on the machine.

3. An attachment for use with a modified single needle sewing machine having a throat-plate provided with two needle holes and an opening through which a looper operated by said attachment may move above and below said throat-plate, a reciprocating needle bar provided with means for carrying a second needle, two needles carried thereby, a rotary loop-taker and actuating means therefor operating below said throat-plate and arranged to coact with one of said needles, and feed mechanism including a feed dog provided with means to permit transverse passage therethrough of said looper, said attachment comprising a housing, a shaft journalled therein, a coupling to said machine for driving said shaft, a gear carried by said shaft, a cross shaft journalled in said housing, a mating gear carried by said cross shaft, a first eccentric carried by said first shaft for actuating a trimming device, a second eccentric carried by said first shaft for actuating a thread control lever, a third eccentric carried by said cross shaft and provided with a thread-looper, and a fourth eccentric carried by said cross-shaft and provided with a second thread-looper, said thread-loopers being arranged to coact with each other and with one of said needles to form overedge stitching, one of said loopers being arranged to operate transversely between said throat-plate and said rotary loop-taker without interference during the formation of stitches by the interaction of said loop-taker and the other of said needles when said attachment is mounted on the machine.

4. An overseaming attachment for a modified sewing machine having a cloth-plate, a throat-plate provided with two needle holes and an opening adjacent thereto through which a looper operated by said attachment may move above and below said throat-plate, a vertically reciprocable needle bar provided with two thread carrying needles, one of which is an overedge needle, a thread carrying looper means disposed beneath said cloth plate for cooperation with one of said needles, drive means for said needle bar and said looper mean, and feed mechanism including a feed dog provided with means to permit transverse passage therethrough of said attachment operated looper, said attachment comprising a housing removably supported by and projecting upwardly from said cloth-plate, a pair of rock shafts supported by said housing, a primary thread carrying looper secured to one of said rock shafts for cooperation with said over-edge needle, a secondary thread carrying looper secured to the other rock shaft for cooperation with said primary looper, and drive connections between said rock shafts and said drive means.

5. The structure according to claim 4, in which said throat-plate is in the form of a mounting plate removably secured to said cloth-plate in substitution for the usual throat-plate and to which said housing is secured, together with a needle plate attached to said mounting plate.

6. The structure according to claim 5, together with a stationary trimming cutter secured to said needle plate, and a movable trimming cutter supported by said housing.

7. The structure according to claim 6, wherein said movable cutter is supported by a shaft rockably journalled in said housing.

8. The structure according to claim 4, wherein said housing is of L-form in plan, said rock shafts being disposed in one branch of the L, a rotatable shaft in the other branch of the L, and eccentric and strap drive connections between said rock shafts and said rotatable shaft.

9. The structure according to claim 4 wherein the drive connections between the rock shafts and the drive means include a drive shaft journalled in the housing; a coupling on the drive shaft adapted to be attached to said drive means; a gear carried by the drive shaft; a cross shaft journalled in the housing; a mating gear carried by said cross shaft; and eccentrics carried by the cross shaft for actuating the rock shafts.

10. The structure according to claim 9 wherein the drive shaft carries an eccentric, together with a shaft, parallel to the drive shaft, journalled in the housing, a strap connection between said eccentric and said parallel shaft, and a thread control mechanism operated thereby.

11. The structure according to claim 10 wherein the drive shaft also carries a second eccentric, together with a second parallel shaft journalled in the housing, a strap connection between said second eccentric and said second parallel shaft, and a trimming mechanism operated thereby.

12. In a sewing machine having feed mechanism including a feed dog having a transverse passageway therethrough; dual stitchforming mechanism including a pair of vertically reciprocating thread carrying needles, the first of said mechanisms including a loop-taker, and the second of said mechanisms including at least one thread carrying looper; and actuating means therefor; a throat-plate having two needle holes and an opening through which said looper may move above and below the throat-plate; said loop-taker operating below the throat-plate and coacting with one of said needles to form a first rectilinear stitch; said looper being operated to pass through the opening in the throat-plate and transversely through the passageway in said feed dog to coact with the second of said needles in a horizontal plane below the throat-plate and immediately above said loop-taker to form a second line of stitching.

13. A sewing machine according to claim 12 in which the actuating means for the second stitchforming mechanism includes at least one rock shaft whose axis of operation is disposed wholly above the throat-plate.

14. A sewing machine according to claim 12 in which the actuating means for the second stitchforming mechanism includes a shaft on which said looper is mounted, said shaft having an axis of rotation disposed wholly above the throat-plate and arranged to operate said looper on an arcuate path above and below the throat-plate.

15. A sewing machine according to claim 12 in which said loop-taker is a rotary hook coordinated to coact with the first of said needles to form a first line of lockstitching.

16. A sewing machine according to claim 12 in which the actuating means for the second stitchforming mechanism includes a pair of rockshafts whose axes of rotation are wholly disposed above the throat-plate, each of said rockshafts carrying a looper, said loopers being arranged to coact with each other and the second of said needles to form the second line of stitching.

17. A sewing machine according to claim 16 in which the axes of rotation of each of said rockshafts are angularly disposed one to the other.

18. An attachment for a modified single needle sewing machine having a cloth-plate, a throat-plate having two needle holes and an opening through which a looper operated by said attachment may move above and below said throat-plate, stitchforming mechanism including a reciprocating needle bar, said needle bar being provided with means for carrying a second needle, a pair of needles carried by said needle bar, a loop-taker mounted and operating below the throat-plate and arranged to coact with one of said needles, and feed mechanism including a feed dog provided with means to permit transverse passage therethrough of said looper, said attachment comprising a unitary housing adapted to be mounted on the cloth-plate of said machine, and complementary overedge stitchforming devices supported and operated from said housing, including a looper arranged to move above and below said throat-plate through the opening therein and transversely through the feed dog to cooperate with the second of said needles when the housing is mounted on the cloth-plate.

19. An attachment for a modified single needle sewing machine having a cloth-plate, a throat-plate having two needle holes and an opening through which a looper operated by said attachment may move above and below said throat-plate, stitchforming mechanism including a reciprocating needle bar, said needle bar being provided with means for carrying a second needle, a pair of needles carried by said needle bar, a loop-taker mounted and operating below the throat-plate and arranged to coact with one of said needles, and feed mechanism including a feed dog provided with means to permit transverse passage therethrough of said looper, said attachment comprising a unitary housing adapted to be mounted on the cloth-plate of said machine and a pair of looper elements supported by and operated from said housing, one of said loopers being arranged to move above and below said throat-plate through the opening therein and transversely through the feed dog to cooperate with the second of said needles when the housing is mounted on the cloth-plate.

20. An attachment for a modified single needle sewing machine having a cloth-plate, a throat-plate having two needle holes and an opening through which a looper operated by said attachment may move above and below said throat-plate, stitchforming mechanism including a reciprocating needle bar, said needle bar being provided with means for carrying a second needle, a pair of needles carried by said needle bar, a loop-taker mounted and operated below the throat-plate and arranged to coact with one of said needles, and feed mechanism including a feed dog provided with means to permit transverse passage therethrough of said looper, said attachment comprising a unitary housing adapted to be mounted on the cloth-plate, complementary stitchforming devices carried by said housing arranged to cooperate with the second needle to form an overedge line of stitches spaced from and parallel to the first line of stitching, one of said devices comprising a looper arranged to move above and below said throat-plate through the opening therein and transversely through said feed dog to cooperate with said second needle when the housing is mounted in position on the cloth-plate, and means within said housing for operating said complementary stitchforming devices carried thereby.

21. The combination of a modified single needle sewing machine having a cloth-plate, a throat-plate provided with two needle holes and an opening adjacent thereto, stitchforming mechanism including a vertically reciprocating needle bar, said needle bar being provided with means for carrying a second needle, a pair of needles carried by said needle bar, a loop-taker mounted and operating below said throat-plate and arranged to coact with one of said needles to form a first rectilinear line of stitching, and feed mechanism including feed dog means having a top surface adapted to feed the work and having a transverse clearance below said working surface for passage of an overedge looper operated from above said working surface; with a unitary housing mounted on the upper surface of said cloth-plate, and complementary overedge stitchforming mechanism supported by and operated from said housing, said mechanism including a looper arranged to move above and below said throat-plate through the opening therein and through said clearance beneath the working surface of said feed dog means to cooperate with the second of said needles to form a second line of overedge stitching.

References Cited in the file of this patent

UNITED STATES PATENTS

| | | |
|---|---|---|
| 1,528,499 | Moffatt | Mar. 3, 1925 |
| 1,640,201 | Maier | Aug. 23, 1927 |
| 1,750,041 | Gruman | Mar. 11, 1930 |
| 2,157,373 | Weis | May 9, 1939 |
| 2,158,430 | Sandberg et al. | May 16, 1939 |
| 2,218,796 | Knaus et al. | Oct. 22, 1940 |
| 2,254,875 | Rubel | Sept. 2, 1941 |
| 2,267,581 | Zonis | Dec. 23, 1941 |
| 2,730,060 | Schoij et al. | Jan. 10, 1956 |
| 2,834,309 | Russell et al. | May 13, 1958 |

OTHER REFERENCES

Federal Standard Stock Catalogue, DDD–S–751, published March 4, 1930.